P. F. RHOADES.
WINDING MACHINE.
APPLICATION FILED MAY 3, 1919.

1,353,269.

Patented Sept. 21, 1920.
6 SHEETS—SHEET 1.

Inventor
Philip F. Rhoades
By his Attorney
Alexander Dewey

P. F. RHOADES.
WINDING MACHINE.
APPLICATION FILED MAY 3, 1919.
1,353,269.
Patented Sept. 21, 1920.
6 SHEETS—SHEET 2.
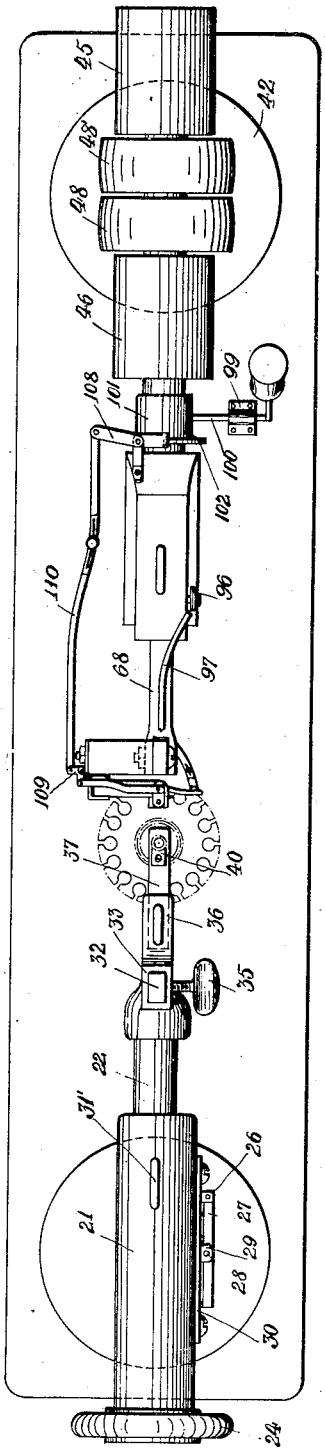
Fig. 2
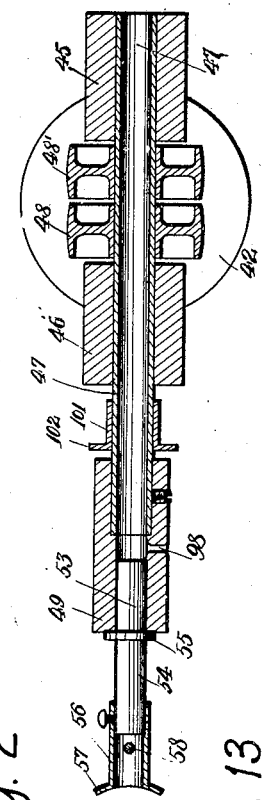
Fig. 13
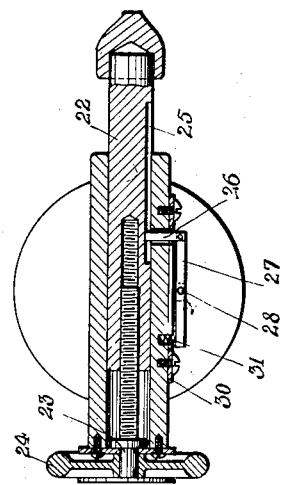
Inventor
Philip F. Rhoades
By his Attorney
Alexander Ames

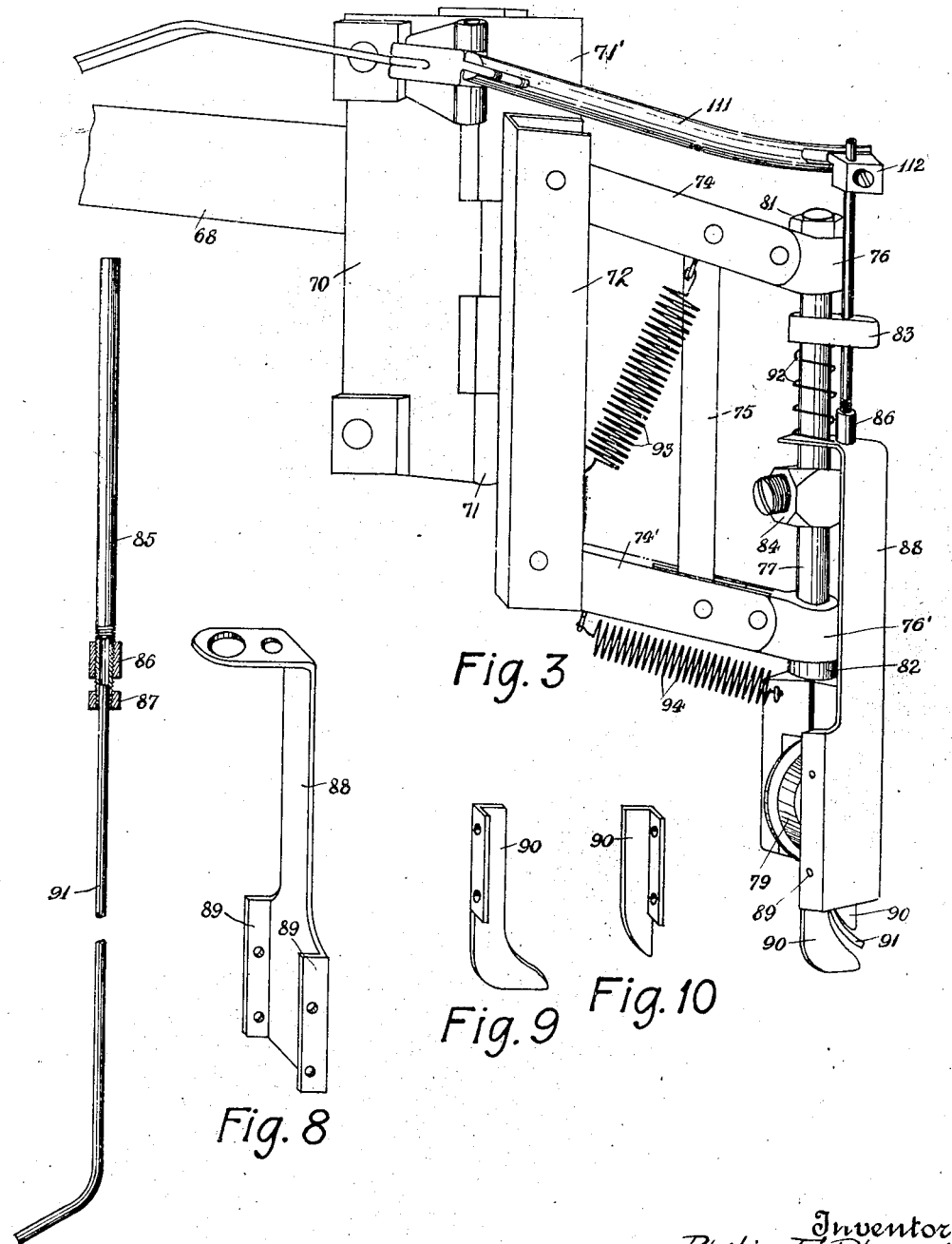

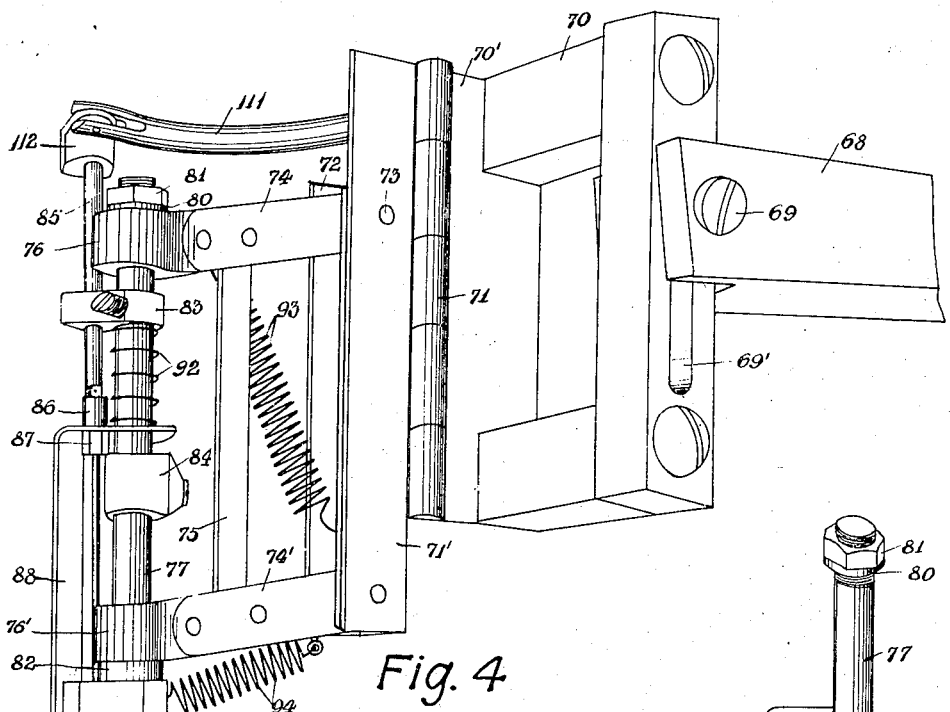
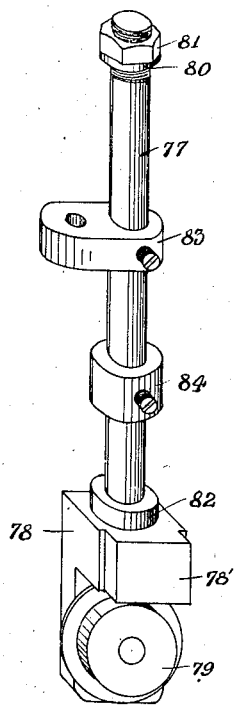
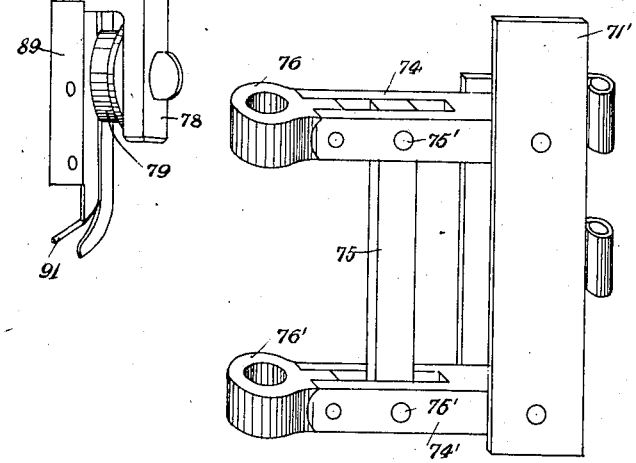
Fig. 4
Fig. 5
Fig. 6
Inventor
Philip F. Rhoades
By his Attorney

UNITED STATES PATENT OFFICE.

PHILIP F. RHOADES, OF NEW YORK, N. Y., ASSIGNOR OF ONE-THIRD TO WILLIAM M. WELLING, OF LONG VALLEY, NEW JERSEY.

WINDING-MACHINE.

1,353,269.  Specification of Letters Patent.  Patented Sept. 21, 1920.

Application filed May 3, 1919. Serial No. 294,598.

*To all whom it may concern:*

Be it known that I, PHILIP F. RHOADES, a citizen of the United States, residing at New York city, in the county of New York and State of New York, have invented new and useful Improvements in Winding-Machines, of which the following is a specification.

This invention relates to a winding machine, the invention being more particularly related to an improved machine for coil winding objects such as dynamo-armatures, electromagnets and the like.

In the present instance, I have shown the preferred embodiment of my invention as operating in conjunction with a well-known type of dynamo-armature, but I wish it to be understood that I do not limit myself to this particular application of the invention, as the latter in its broad aspects provides efficient mechanism for winding or enwrapping with coils various objects or forms required to be coil wound or enwrapped.

A main object of my invention is the provision of a simple and efficient machine of this character, embodying means for holding objects or forms of different size or shape, and embodying power driven winding mechanism adapted to have movement about or around the object to be wound, the winding mechanism including a needle through which the wire or other material to be coiled, is led, distributed and placed symmetrically and with uniform tautness upon the object to be wound.

Another object of the invention is the provision of a machine of this character having its parts so arranged and connected that they may be readily adjusted in a variety of ways in order efficiently to compensate as may be necessary for objects differing in size, form or construction; there also being in view in this connection the provision of means for subjecting the parts in their variously adjusted relations to uniform pressure or tension, whereby to obtain uniformity in the winding, irrespective of the relative size, shape or structural details of the article to be wound.

Another object of the invention is the provision in a machine of this character of a novel feeding needle, mounted so as to have relative movement both lengthwise and sidewise in order to enable the application of the coils in the specific positions desired.

With the foregoing objects in view and others, the invention resides in the details of construction and in the arrangement and combination of parts hereinafter described, and defined in the claims hereunto appended; and it will be understood that changes and alterations in the precise embodiment of the invention as herewith disclosed, may be made, to which changes and alterations the inventor is entitled, provided the same are effected within the scope of what is claimed.

The preferred embodiment of my invention, as reduced to practice, is illustrated in the accompanying drawings, which form a material part of this specification, and in which:—

Fig. 2 is a top plan view thereof.

Fig. 3 is a view in perspective of the rotatorial mechanism for carrying and applying the wire.

Fig. 4 is a similar view of the same, taken from the opposite side and at a different angle.

Fig. 5 is a perspective view of the pivotally connected frame included in said mechanism.

Fig. 6 is a perspective view of the shaft rockably carried by said frame.

Fig. 7 shows the needle and its holder, parts being broken away and parts being shown in section.

Fig. 8 is a perspective view of the plate for supporting the needle holder and the guiding shoes.

Figs. 9 and 10 are views in perspective of the coöperating guiding shoes.

Fig. 13 is a longitudinal sectional view, taken on the line 13—13 of Fig. 1.

Figure 1:
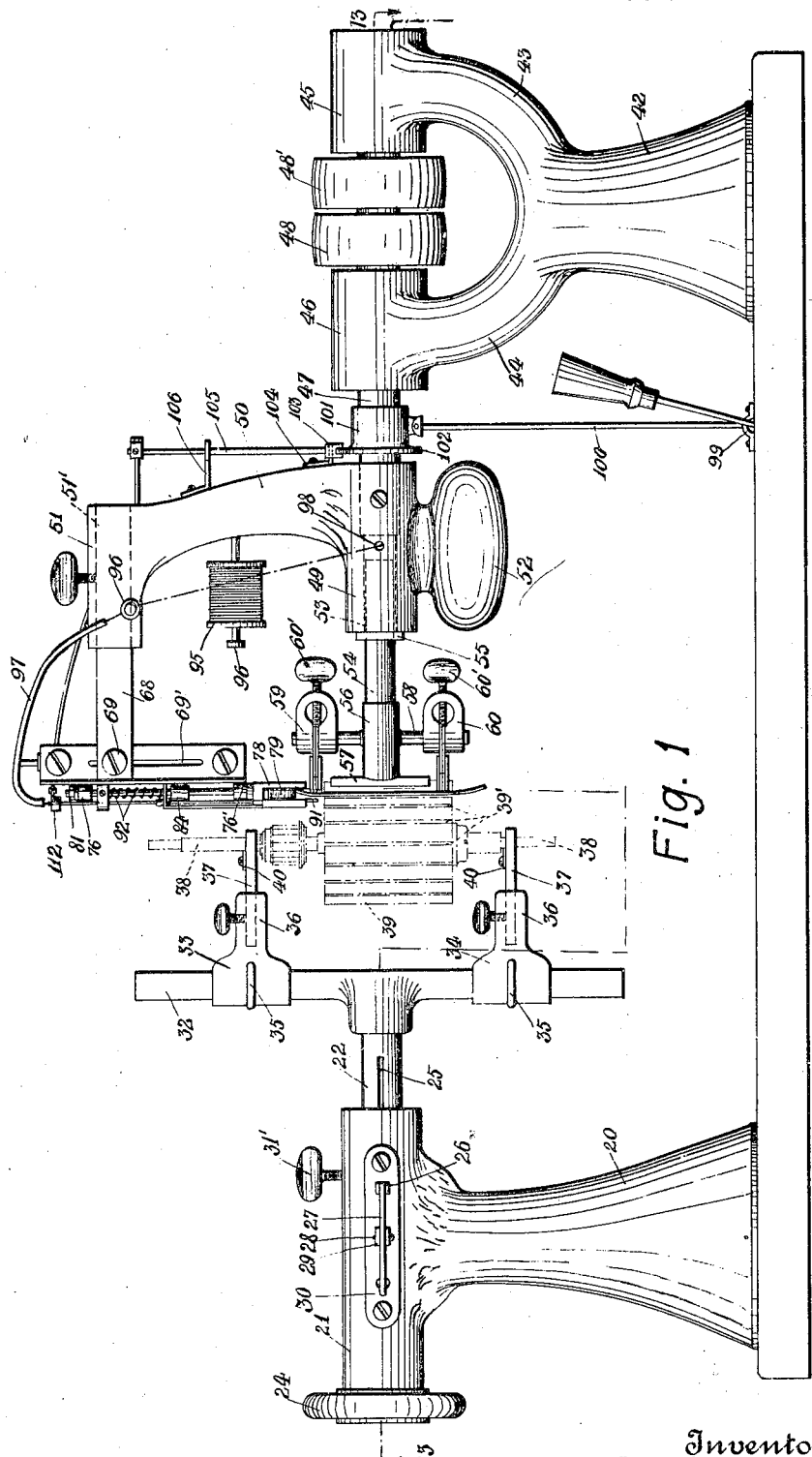
Figure 1 is a view in side elevation of a machine made in accordance with my invention.

With more particular reference to the accompanying drawings, the numeral 20 denotes a single standard or casting, designed preferably in the form shown (Fig. 1), and made for instance with a cylindrical head 21, provided therethrough with a longitudinal bore, in which is loosely fitted a shaft 22, considerably longer than the head, and within the outer end of which is screw-threaded (Fig. 13) the stem of axis 23 of the hand-wheel 24. The shaft 22 is provided with a longitudinal slot 25 adapted to receive the inner end of a wedge-shaped key 26, carried by a lever 27, fulcrumed at 28 to a post 29, outwardly projecting from a plate 30, which is rigidly secured by screws or otherwise to the exterior surface of the head 21.

Acting on lever 27 is a push spring 31 which normally tilts the same into position for keeping the key engaged in the slot 25, the said head 21 and plate 30 being of course, provided with suitable openings for the operation of the key. The shaft 22 is thus held locked against rotary movement, while it can be extended or retracted through an obvious manipulation of the hand-wheel 24. By pressing in the lever 27 against the tension of its spring, the key will be withdrawn from its slot, so that the shaft may be turned in conjunction with the turning of the hand-wheel, for a purpose presently to be made manifest. A thumb-screw 31' threaded transversely into the head serves as means for pinching and holding the shaft against axial movement and in the adjusted position desired.

Fitted as shown, midway its length upon the shaft 22 is a vertical bar 32. Slidably engaged upon this bar are the bracket-hangers 33 and 34, each provided with a thumb-screw 35 or other equivalent means by which it may be secured in the adjusted position desired. These bracket-hangers are each formed with an extension 36, having a square opening for the reception of a supporting plate 37, which may be secured in the relative position desired by means of a thumb-screw or otherwise. Near their free ends these plates 37 are each transversely holed through for receiving the shaft 38 of the armature 39, herein shown to be an armature of a well-known type, consisting of a drum provided with spaced half-closed slots 39'. In this manner I provide a construction capable of ready adjustment to support armatures or other objects differing in size or shape: the shaft 22 being relatively adjustable in its supporting head, the bracket-hangers being adjustable toward and away from each other, and the supporting plates being adjustable lengthwise in the bracket hangers.

To prevent the armature 39 from turning, I may for instance pivot to the plates 37, cam or clip devices 40, adapted to have a wedging action on the shaft 38. By withdrawing the key 26 from its slot as hereinbefore described, the shaft 22 may be readily turned to bring the vertical bar 32 into horizontal position or into any oblique position desired for the convenient application or removal of the armature.

42 represents a single standard or casting, formed preferably as shown with the upwardly curved arms 43 and 44 terminating in the respective bearing heads 45 and 46, in which is rotatably held a hollow shaft 47, whose rotation is controlled through the use of the usual fixed and loose pulleys 48 and 48', located between said bearing heads 45 and 46. The shaft 47 projects toward and is in alinement with, the shaft 22. Rigidly secured to the projecting end of this shaft, a distance from the bearing head 46, is the cylindrical portion 49 of the radially projecting frame 50, whose enlarged outer end 51 is provided with a square cavity 51'. Opposite the radially projecting portion 50, there is cast with the cylindrical portion 49, an enlargement 52 of such size and form as to counter-balance the frame 50, and thereby to obtain uniform rotary movement.

Fitted in the bore 53 of the portion 49 is a thrust shaft 54 having a thrust collar 55, adapted to bear on the end of the said portion 49. Telescoping the thrust shaft 54 is a second thrust shaft 56 carrying a pressure plate 57, made arcuate in horizontal section, to conform with and bear upon the periphery of the armature drum 39. By turning the hand-wheel 24, the drum can be moved tightly against the plate 57, so that the thrust shafts 54 and 56 will be held stationary notwithstanding the rotation of the frame 50.

Figure 12:
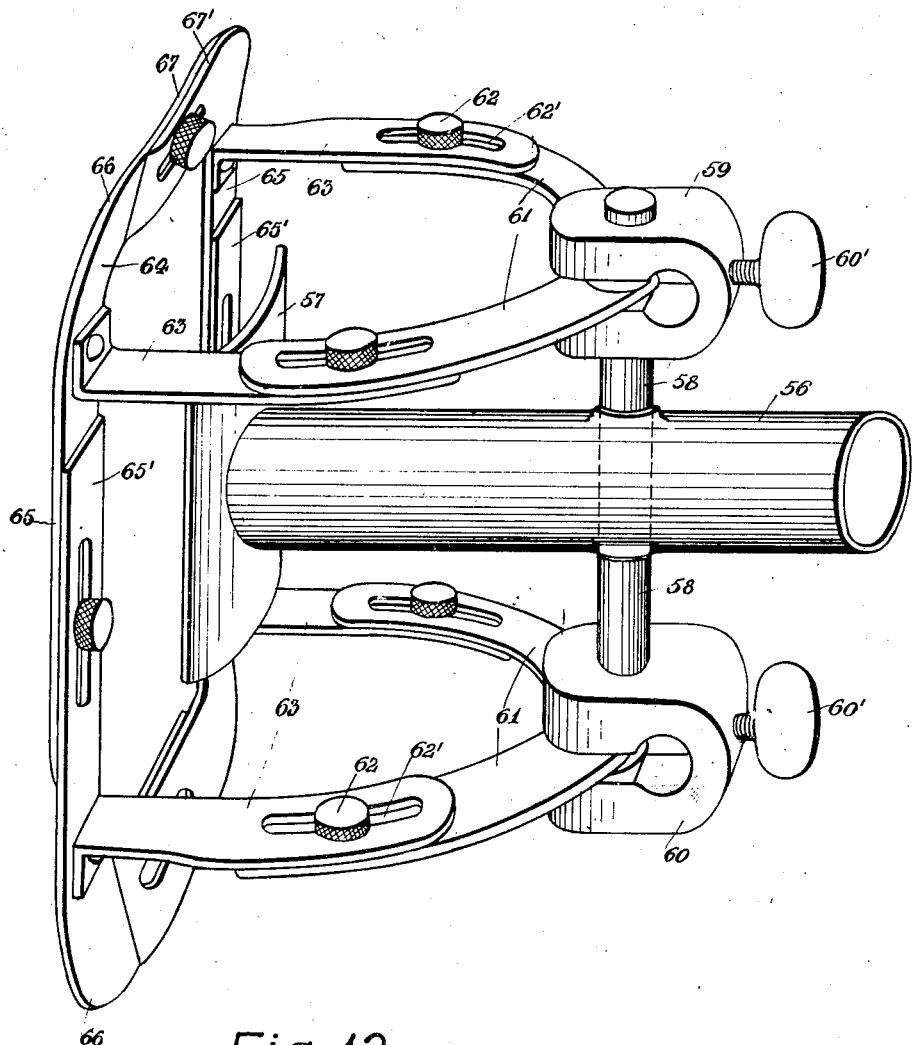
Fig. 12 is a view in perspective of the adjustable structure for supporting the adjustable endless track from the thrust shaft.

As best illustrated in Fig. 12, there extends through the thrust shaft 56, a transverse shaft 58, on which is adjustably engaged the bifurcated bracket-hangers 59 and 60, each having a thumb-screw 60' or equivalent means, whereby to be secured on the shaft in the relative position required. Swiveled on the shaft 58 in the bight of each bracket-hanger is a pair of curved horizontal arms 61, adjustably carrying by means of the screw and slot structures 62 and 62' as shown, a second pair of curved horizontal arms 63, to the outer angular extremities of which is riveted an endless track 64, comprising as shown pairs of slidably engaged side parts 65 and 65' which are curved as at 66 toward each other to produce the slidably engaged end parts 67 and 67'. These side and end parts are, like the horizontal supporting arms, adjustably connected through the employment of screw and slot structures. In view of the provisions for the adjustment of the bracket-hangers 59 and 60, and also in view of the adjustable connections between the pairs of arms 61 and 63, the track 64 obviously may be relatively adjusted either vertically, transversely or horizontally; so that when the drum 39 is bearing against the plate 57, the track 64 may be made to surround any sector of the drum up to and including a vertical plane drawn through its center. The end parts 67 and 67' are inwardly bowed in order to clear the drum shaft 38 and commutator or other parts carried thereby, when the track is adjusted to cross the center of the drum.

Adjustably fitted in the head 51 of the frame 50 is a horizontal bar 68, to the outer end of which is adjustably connected through the screw and slot structures 69 and 69' a rectangular frame 70, consisting, as best shown in Figs. 4 and 5, of vertical side members connected by cross members, the outer side member 70' being preferably of greater width than its confronting side member. To this side member 70', there is connected by a hinge 71, a plate 71'. 72 is a vertical element of U-shape in cross-section, which has one side as shown riveted to the plate 71', and which commences a distance below the top edge of said plate 71' and extends a distance below the bottom edge thereof. Between the parallel sides of the element 72 are pivoted as at 73, the parallel bars 74 and 74', each bifurcated, as best seen in Fig. 5, for a portion of its length, to receive a connection 75, held by pivots as 75'. Pivoted between the outer ends of these bifurcated bars are the respective bearing heads 76 and 76'. Under this construction, the connected bars 74 and 74' are adapted as a frame to have movement relatively with respect to the supporting element 72, while the said bearing heads 76 and 76' are adapted to have similar movement with respect to said bars.

Extending through the bearing heads 76 and 76' is a shaft 77, to the lower end of which is attached an angular shoe 78, as best shown in Fig. 6. The horizontal portion of this shoe is cut to form a tenon 78', while the vertical portion thereof carries, below the horizontal portion, a flanged wheel 79, designed to travel around the endless track 64. Over the bearing head 76, a washer 80 and a nut 81 are applied to the shaft 77, the latter being screw-threaded thereon, while between the shoe 78 and bearing head 76', there is interposed a washer 82, whereby the shaft 77 is supported in position for rocking movement.

Adjustably engaged upon the shaft 77 between the bearing heads 76 and 76', are two spaced collars 83 and 84. Extending through the collar 83 in parallelism to the shaft 77, is a tubular needle holder 85, the lower end of which is split longitudinally and is threaded exteriorly to receive the collar 86 and the nut 87. Surrounding the shaft 77 above the collar 84, and also the needle holder 85 between the collar 86 and nut 87, is a lug bent from the plate 88, which parallels the shaft 77, and which has formed along its lower end, the confronting lugs 89 (Fig. 8), adapted slidably to embrace the tenon 78'. Riveted to and between the lugs 89, below the engagement thereof with the tenon 78', are the coöperating needle guides 90, between which, as best seen in Figs. 3 and 4, works the hook-shaped end of the tubular needle 91, which is held in the needle holder 85 through the application of the nut 87 on the split end thereof. It will be observed that the plate 88 is upheld by the collar 84 through the nut 87. A spring 92, which surrounds the shaft 77 between the collar 83 and the lug of plate 88, normally urges the nut 87 to rest upon the collar 84, yet permits the plate 88 and in consequence the needle 91 to yield upwardly.

Figure 11:
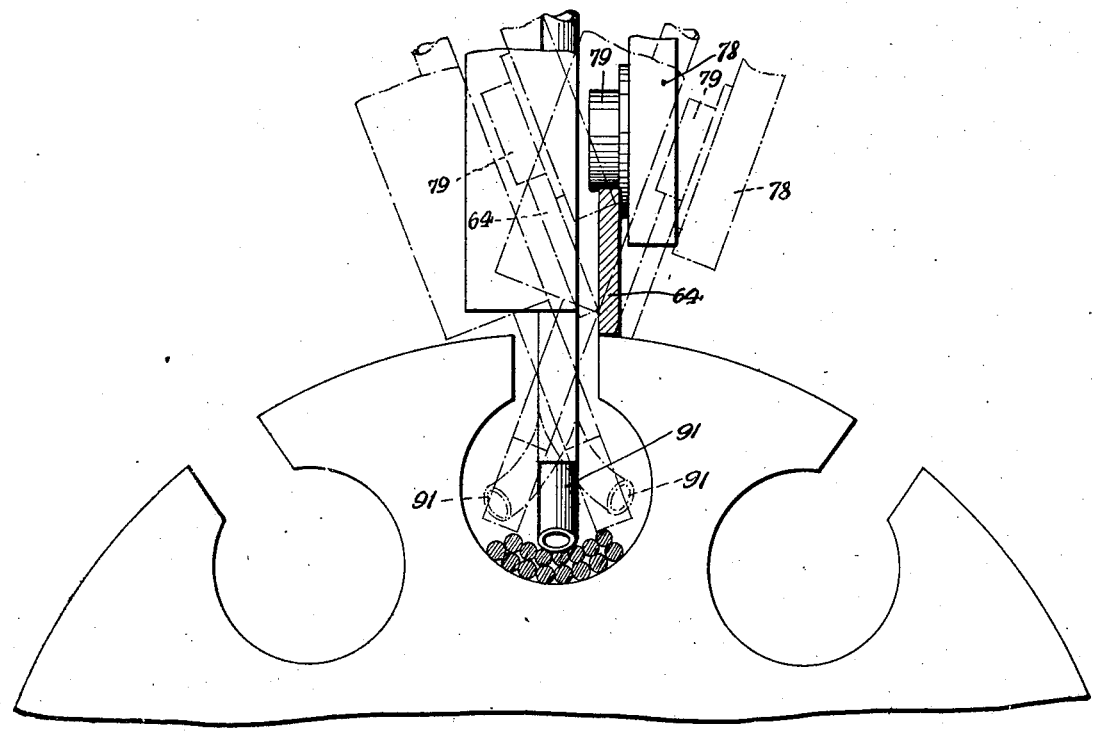
Fig. 11 is a top plan view showing a sector of a slotted armature drum, and showing also partly diagrammatically various positions which the needle and associated parts may be made to assume for the distribution of the wires within a slot.

This whole arrangement is such that when the frame 50 is rotated by the shaft 47, the roller 79 will travel on the endless track 64, while the needle will be carried immediately in advance of the track around the sector of the drum for which the track has been set or adjusted to encompass. The hook-shaped end of the needle normally points toward, and the needle guiding shoes constantly point toward, the shaft supporting the drum. By setting the track so that its opposite sides abut two opposite drum slots as included in the sector encompassed, the hook-shaped needle end as well as the guiding shoes therefor can be passed through the drum slots, as clearly illustrated in Fig. 11. When, therefore, the needle is threaded with wire, as will be presently explained, the wire will be coiled about the encompassed sector of the drum; the same first being led upwardly through a slot, then across the top of the drum, then downwardly through the second slot, then across the lower face of the drum, and then again into the initial slot or into some other slot.

As illustrated in Figs. 3 and 4, a spring 93, connected between the bar 74 and the element 72, tends to hold the pivotally connected frame adjusted in such manner that the roller 79 is held continuously to its track. Another spring 94, connected between the bottom bar 74' and the shoe 78, tends to hold the shaft 77 turned so that the flanged wheel will readily follow the curves and deformations of the endless track.

When the wire employed for winding the drum is relatively light, it may be fed from a reel as 95, working on a spindle 96, supported on the frame 50. From the reel, the wire passes over a pulley 96, on the frame 50, and then through a tubular guide 97, supported upon the frame 70. From the tube 97, the wire is drawn through the needle holder 85, and then through the needle 91, whose hook-shaped end places it in the drum slots, as hereinbefore described.

When the wire employed is relatively heavy, the reel may be supported separately from the machine, but in such position that it will be drawn through the hollow shaft 47, then out through an opening 98 (Fig. 1) provided in the cylindrical portion 49, whence it continues its course over the pulley 96 and through the guide 97 as before. It is of course desirable that the wire as applied be distributed around the interior periphery of each drum slot. To accomplish this, I provide in the present embodiment of the invention, a manually operated mechanism for rocking the needle either to the right or to the left of its normal position as illustrated diagrammatically in Fig. 11. Working in a floor-bracket 99 (Fig. 1), is a hand operated lever 100, which is pivotally engaged with a lug provided on the sleeve 101, loosely fitting the shaft 47 between the bearing head 46 and the portion 49. Integral with this sleeve is formed an annular outwardly projecting flange 102, which works in a block 103, pivoted on a bracket 104, attached to the frame 50. Rigid with this block is a shaft 105, which is held in position by the arm 106. To the top end of the shaft 105 is rigidly attached a link 108. On the frame 70 is the bell crank lever 109, which is connected with the crank 108 by means for instance of a telescoping link 110. To the opposite arm of this bell crank lever is connected for instance a telescoping link 111, including a universal joint, the remote end of this link being pivotally engaged to a lug on the block 112, rigidly fitted to the top end of the needle holder 85. By manipulating the lever 100, movement longitudinally of the shaft 47, either toward or away from the bearing head 46, may be given to the sleeve 101, so as to rock accordingly as the sleeve is moved, the shaft 105; and accordingly as this last-mentioned shaft is rocked the needle 91 may be rocked either to the right or left of its normal position for distributing the wire within the drum slots.

Figure 14:
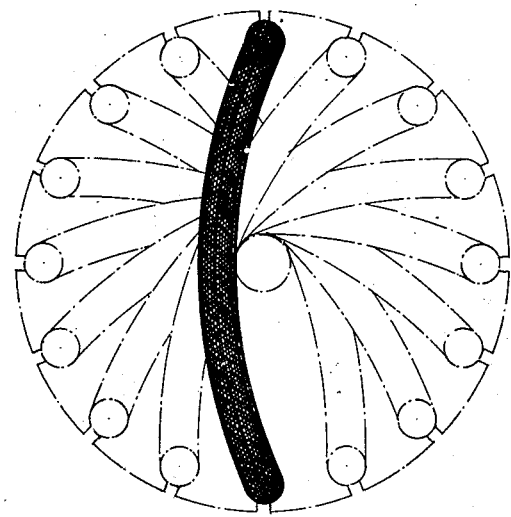
Fig. 14 is a plan view, showing a drum armature as it may be wound by my machine.

As the coils, during the winding operations, accumulate in the center of the drum slots and across the ends of the drum, the larger member of the needle guiding shoes 90 slides thereon, causing the plate 88, the needle holder 85 and the needle 91, as a component structure, to yield outwardly and away from the drum. When the two opposite slots included in a drum sector have been filled with coils to the extent desired, the drum is manually turned to fill with coils a set of slots forming another sector, which may be in direct series or remote series. By remote series, I mean the skipping of one or more sets of slots. The coils of the different sets of slots overlap or cross each other on the ends of the drum, so that dome-like formations are ultimately produced on the ends of the drum, as illustrated in Fig. 14. When the endless track 70 is adjusted to encompass the center of the drum, the curves in the ends thereof provide a clearance for the passage of the needle and its associated parts, around the drum shafts, its collars, or the commutator carried thereby; it being noted in this connection that the hook-shaped needle end is adapted to place the coils close to the shaft, and as well close to said shaft-carried objects.

In commencing the winding operations, the needle is threaded as hereinbefore described, and a portion of the wire is attached, in a manner well known in the art, to constitute a pole, and then placed in the initial slot, after which, through the operation of the winding mechanism, the wire is coiled in the series of slots with uniform tautness.

Having thus described my invention, what I claim is:—

1. In a machine of the kind described, a rotating shaft, means for supporting and positioning a body in line with said shaft, a main frame rotating with said shaft as about an axis, a thrust shaft carried by said frame in alinement with said shaft and having a plate to exert pressure on said body whereby said thrust shaft is held stationary, an endless track carried by said thrust shaft and capable of adjustment to encircle a section of the body, and winding mechanism attached to said frame and traveling around said endless track whereby to coil-wind said body.

2. In a machine of the kind described, a rotatable shaft, means for supporting and positioning a body across the plane of said shaft, a frame fast with said shaft to rotate therewith as about an axis and having a bore in line with said shaft, a thrust shaft in said bore and provided with a plate making pressure on the body, an endless track supported by said thrust shaft and adjustable to encircle varying sections of the body, and winding mechanism adjustably connected with said frame and adapted to travel around said track when the rotatable shaft is actuated, said mechanism including a needle for leading and placing coils around the body.

3. In a machine of the kind described, means for supporting and positioning an object, mechanism for winding coils around the supported object and comprising a shaft and means for driving it, a main frame secured to said shaft to revolve with the same as about an axis, a rigid frame adjustably supported from the outer end of said main frame, a pivotally connected frame hingedly engaged with said rigid frame to have swinging movement in relation thereto and adapted to have movement toward and away from said axis, a tubular needle carried by said pivotally connected frame and adapted to have independent movement with respect thereto both longitudinally and laterally, said needle serving as a medium through which a wire may be wound around the supported object, and means associated with said needle to slide upon the wound coils and to cause the needle automatically to yield away from the object as the successive coils are wound thereon.

4. In a machine for coil-winding a drum having peripheral slots, the combination of means for supporting and positioning the drum, a main frame and means for rotating it as about an axis, a rigid frame adjustably supported at the outer end of said main frame, a pivotally connected frame hingedly engaged with said rigid frame, and a tubular wire-drawing needle supported by the said pivotally connected frame and having a hooked-shaped end adapted to enter said drum slots, adjustable means for guiding said needle in a path about the drum and in a manner to enable said hooked-shaped needle end to pass during each revolution of the main frame through two slots thereof, whereby the needle when the main frame is rotated will lead or draw a wire through both of said slots and across as well the opposite ends of the drum.

5. In a machine of the kind described, the combination of mechanism for coil-winding a body comprising a main frame revoluble about an axis, thrust mechanism carried by the central portion of said main frame and adapted to make pressure on the object to be wound so as to hold the thrust shaft stationary when the main frame revolves, an endless track carried by said thrust shaft and adjustable to encircle a segment or a portion of the object to be wound, other frames adjustably supported from the outer end of said main frame, one of which is capable of relative movement, a shaft carried by said relatively movable frame and means carried thereby for traveling around said track, a wire feeding needle carried by said relatively movable frame and adapted when the main frame is revolved to wind coils about said body, and manually operated means for rocking said needle whereby to distribute said coils as they are wound.

6. In a machine of the kind described, the combination with a shaft and means for driving it, a main frame secured to said shaft to revolve therewith as about an axis, a thrust shaft operatively engaged with the central portion of said main frame in alinement with said driving shaft and provided with means to bear upon an object to be coil-wound so as to be held stationary, an adjustable track frame carried by said thrust shaft and provided with an endless track adjustable to encircle the object to be wound, and mechanism adjustably supported from the outer end of said main frame and adapted to travel around said track and including a tubular feeding needle adapted when the main frame is revolved to draw coils around the object to be wound.

7. In a machine of the kind described, the combination of a pair of shafts arranged in longitudinal alinement, means for projecting and retracting one shaft, means for rotating the other shaft, adjustable means on said first shaft for supporting and positioning a body to be coil-wound, a main frame attached to said rotatable shaft to rotate therewith, as about an axis, a thrust shaft having bearing in said main frame in alinement with said rotatable shaft and having means to make pressure on the supported object to be wound so as to be held stationary, an endless track supported upon said thrust shaft and adjustable to the object to be wound, and winding mechanism supported from said main frame and adapted to travel around said track whereby to effect the coil-winding of said body.

8. In a machine of the kind described, the combination with an endless track and a main frame revoluble about an axis in relation thereto, of other frames adjustably supported from the outer end of said main frame in position to be carried around and guided by said track when said main frame is revolved, one of said frames being hingedly engaged to swing toward and away from the main frame and having pivotally connected parts adapted to have movement in the direction of said track, a shaft carried by said pivotally connected parts and having turning movement and provided with a wheeled shoe to travel around said track, a supporting plate having sliding connection with said shaft and with said shoe on the side of the track remote from the main frame, resilient means mounted on said shaft and normally urging said supporting plate toward the track, a tubular needle carried by said supporting plate and having a curved end projecting from the inner end thereof alongside said track, said needle serving as a medium through which a wire may be coiled when the main frame is revolved.

9. In a machine of the kind described, the combination with an endless track and a revoluble main frame, the central region of the track being in line with the axis about which the frame revolves and the distance around said track being considerably less than the circle described by the frame when revolved, of mechanism adjustably supported from the outer end of the main frame to travel about said track and having a flanged wheel to travel on said track, said mechanism including a hingedly engaged pivotally connected frame adapted to have movement toward and away from the main frame and toward and away from said track, a tubular needle supported by the last-mentioned frame and terminating in a curved end projecting alongside said track, and manually operated means for imparting rocking movement to said needle.

10. In a machine of the kind described, the combination with an endless track having inflections and a revoluble main frame, the central region of the track being in line with the axis about which the frame revolves and the distance around the track being considerably less than the circle described by the frame when revolved, a coil-winding mechanism adjustably supported from the outer end of the main frame and adapted to travel about said track and having a flanged wheel to travel on said track, said mechanism including frames of which one is arranged to have movement toward and away from said main frame and toward and away from said track to permit said wheel to follow the contour of the track despite the set circular movement of said frame, spring means associated with said movable frame by which to hold the parts in such adjusted relation that the wheel is held constantly in engagement with its track, a plate carried by said movable frame on the side remote from the main frame and projecting beyond said track wheel, said plate being adapted to have independent yielding movement, a tubular needle supported on said plate and serving as a medium through which to coil wire around an object, and a shoe device carried by said plate to slide upon the wound coils whereby to cause said plate and needle to yield away from the track as the coils accumulate.

11. In a machine of the kind described, the combination with an endless track having lateral curves and adjustable to encompass an object, of mechanism for coil-winding the object so encompassed and comprising a main frame rotatable about an axis, a bar adjustably supported in the outer end of said main frame, a rigid frame adjustably connected with the outer end of said bar, a pivotally connected frame hingedly engaged with said rigid frame, a shaft having bearings in said pivotally connected frame and provided with a shoe, a flanged wheel carried by said shoe and engaging said track, spring means normally urging the pivotally connected frame constantly toward the track, and spring means normally urging said shaft in such position that said wheel is constantly positioned for readily following the lateral curves in said track.

12. In a machine of the kind described, the combination with an endless track adjustable to encompass an object, of mechanism for coil-winding the object so encompassed and comprising a main frame rotatable about an axis, a rigid frame supported by said main frame, a pivotally connected frame hingedly engaged with said rigid frame, a shaft having bearing in the pivotally connected frame and provided with a wheel adapted to travel around said track, a plate loosely mounted on said shaft and paralleling the same and projecting beyond said track on the outer side thereof, a spring acting on said plate and urging it normally in the direction of said track, means carried by said plate through which to draw wire about the encompassed object when the main frame is revolved, and means carried on the extremity of said plate to slide on the accumulating coils whereby to force said plate and the parts supported thereby outwardly or away from said track as the winding progresses.

13. In a machine of the kind described, the combination with an endless track adjustable to encompass an object, of mechanism for coil-winding the object so encompassed and comprising a main frame rotatable about an axis, a structure adjustably supported from the outer end of said main frame and carrying a flanged wheel adapted to travel on said track, said structure including parts adapted to have relative movement toward and away from said main frame and toward and away from said track, means associated with said movable parts to hold said wheel in constant engagement with said track whereby to follow the contour thereof, a tubular needle carried by said structure and terminating in a curved end alongside of said track and adapted to serve as a medium through which to coil wire around the encompassed object, and manually operated means for imparting at will rocking movement to said needle whereby to distribute and place the wire upon the object as coiled thereon.

14. In combination, a shaft and means for rotating the same, means for supporting and positioning an object in line with the shaft, a main counter-balanced frame projecting from said shaft and rotatable therewith as about an axis, a thrust shaft journaled in said frame in alinement with said main shaft and having means to make pressure on the positioned object whereby to maintain said thrust shaft stationary, means combined with said thrust shaft for supporting an endless track in advance of said thrust shaft plate, said track being adjustable to encompass the positioned object, coil-winding mechanism adjustably supported from the outer end of said main frame and having a flanged wheel engaging said track, said mechanism being adjustable to compensate for concentric and lateral variations between the set path of said main frame and the contour of said endless track, a tubular needle carried by said mechanism and terminating in a curved end alongside said track, said needle being adapted to have both longitudinal movement and rocking movement relative to said mechanism and serving as a medium through which wire may be coiled around the encompassed object when said main frame is revolved, and means whereby at will to impart rocking movement to said needle for placing and distributing the wire as it is coiled.

In testimony whereof I have signed my name to this specification.

PHILIP F. RHOADES.